June 9, 1959     S. R. TONGRET     2,890,351
ADJUSTABLE HOUSING FOR RADIATION DEVICES
Filed March 6, 1956
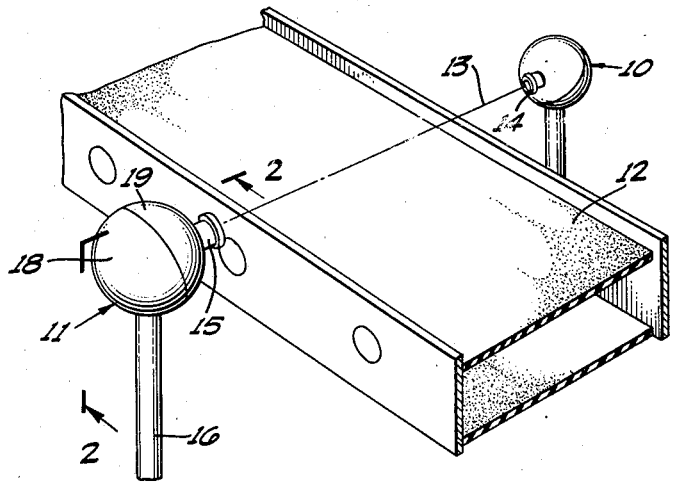
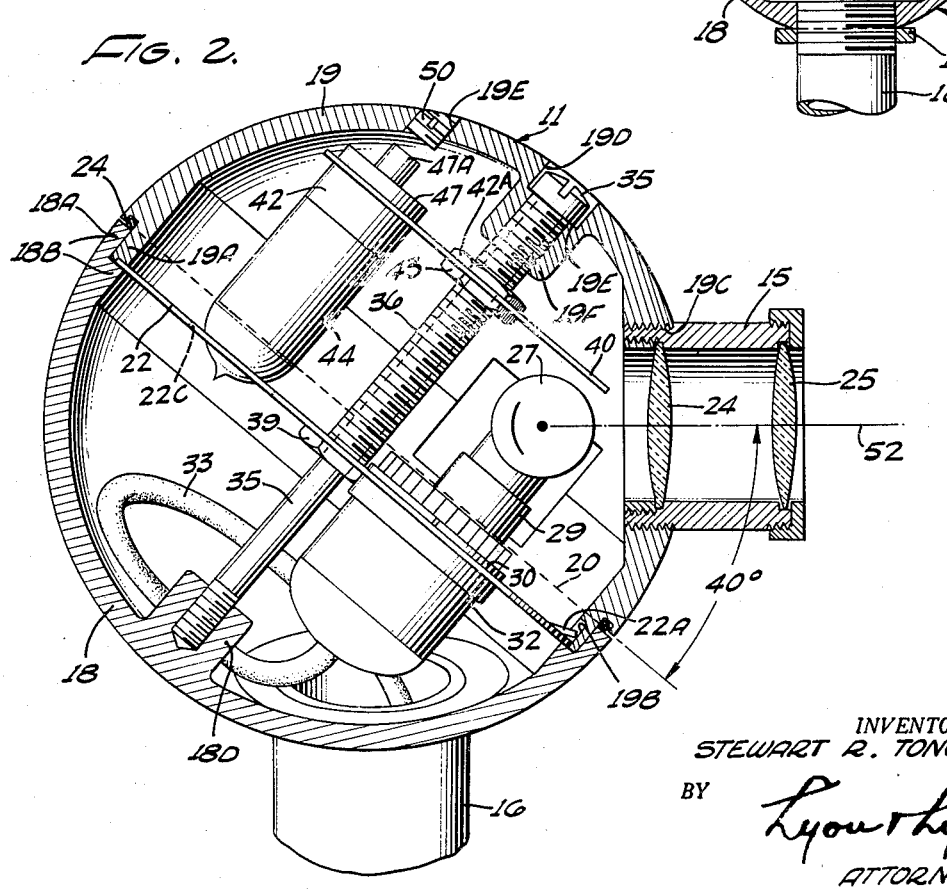
INVENTOR.
STEWART R. TONGRET
BY
*Lyon & Lyon*
ATTORNEYS

United States Patent Office 2,890,351
Patented June 9, 1959

2,890,351

ADJUSTABLE HOUSING FOR RADIATION DEVICES

Stewart R. Tongret, Los Angeles, Calif.

Application March 6, 1956, Serial No. 569,804

5 Claims. (Cl. 250—239)

The present invention relates to improved structures for housing radiation emitting and responsive means, and, in particular, to such structures which allow convenient alignment for either emitting radiation or receiving radiation from different directions.

In installing apparatus which depends for its operation on the transmission or reception of radiation such as, for example, a photoelectric system, an alignment problem arises since for successful operation the radiation emitting means and the radiation emitting structure and the radiation receiving structure are required to be aligned. It is desirable that the structures used for housing the electrical apparatus be confined in a relatively small space in housings which are pleasing in appearance and incorporating features that allow convenient alignment.

It is, therefore, a general object of the present invention to provide improved structures for obtaining the desirable features mentioned above.

A specific object of the present invention is to provide a housing for radiation means incorporating an adjustable part thereof which permit alignment of a radiation receiving or emitting aperture, not only in azimuth but also in elevation.

Another specific object of the present invention is to provide a structure of this character which allows convenient assembly and disassembly of the components therein.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1 is a perspective view illustrating a pair of structures each incorporating features of the present invention used in the example shown in relationship to a conveying belt;

Figure 2 is a sectional view taken generally on the line 2—2 of Figure 1; and

Figure 3 is a detailed sectional view showing the manner in which the spherical housing is secured on a mounting post.

With reference to Figure 1, a pair of structures 10 and 11 each incorporating features of the present invention are illustrated on opposite sides of a conveying belt 12 on which articles may be carried. The radiation beam as, for example, a light beam 13 passing through aligned tubular portions 14 and 15 is interrupted by such article (not shown) on the conveying belt for purposes of producing a signal or a control operation using for that purpose a source of radiation, radiation responsive means and electrical circuitry associated with such radiation responsive means of the character well known in the art.

The present invention is concerned particularly with the housing for the radiation producing means and the housing for the radiation responsive means and an internal structure in the housing for mounting the electrical apparatus.

With reference to Figure 2, the housing 11 is supported on a tubular support 16 which, as shown in Figure 3, has its upper end threaded and engaging a threaded portion of the housing 11. A releasable jam nut 17 secures the housing 11 on the support 16 in an adjusted position.

The housing 11 which is essentially a sphere is thus rotatably mounted about the axis of the tubular support 16.

Such housing 11 includes a pair of hollow hemispherical members 18 and 19 which are nested together on a plane 20 extending at an acute angle with respect to the axis of the support 16. A circular chassis plate 22 is sandwiched between the nested members 18 and 19. This nested structure is provided by the annular rim 19A of reduced cross section of member 19 engaging the annular internally grooved portion 18A of the member 18. If desired for weatherproof purpose, an O-ring 24 is recessed in the member 19 and engages the opposite face of the member 18. The chassis plate 22 is clamped between the rim 19A and the annular shoulder 18B of member 18; and in order to prevent rotation of the chassis plate 22, it is provided with a tongue portion 22A which is disposed in a small grooved portion 19B of member 19.

The member 19 has an internally threaded apertured portion 19C for receiving the threaded end of the radiation tube 15 having releasably secured therein a lens system including, for example, the lenses 24 and 25 for focusing incoming radiation onto the radiation responsive device 27 illustrated in Figure 2 as a photoelectric cell. The cell 27 is releasably secured in a conventional socket 29 mounted on the chassis plate 22. Also secured on the chassis plate 22 is a connector 30 which cooperates with a connecting plug 32 for purposes of connecting one or more wires in the cable 33 to terminals on the connector 30 so that the electrical apparatus may be energized and control signals conveyed therefrom. It is noted that the detachable plug 32 is entirely on one side of the chassis plate 22 and is confined entirely within the lower housing member 18. The connecting cable 33 is conveniently concealed by passing the same through the tubular support 16.

The housing members 18 and 19 are releasably secured together by a bolt 35 which passes centrally therethrough, one end of the bolt 35 being received in an internally threaded boss 18D on member 18 and the head of the bolt 35 being recessed in the circular apertured portion 19D of member 19 and bearing against the annular shoulder 19E of the internally threaded tubular portion 19F. This internally threaded tubular portion 19F receives a threaded sleeve 36 through which, of course, the bolt 35 extends. A jam nut 39 on the threaded sleeve 36 serves to clamp the chassis plate 22 on the member 19. The sleeve 36 also mounts a sub-chassis plate 40 which has an apertured portion through which the sleeve 36 extends. A pair of jam nuts 42A and 43 adjustably secure the sub-chassis plate 40 on such sleeve 36. This sub-chassis plate 40 carries a tube socket 42 which receives a conventional electron type of tube 44. The tube 44 is connected in conventional manner to the photocell 27 to amplify voltage variations produced in the circuitry associated with the photocell 27. In order to allow the tube 44 to be conveniently inserted and removed, such tube 44 is in alignment with an apertured portion 22C of the chassis plate 22 through which, as shown, a portion of the tube 44 extends. Preferably, the amplifying circuit associated with tube 44 has a conventional sensitivity control in the form of, for example, an adjustable potentiometer type of resistance 47. The adjustable element 47A of the sensitivity control 47 is in alignment with an apertured portion 19E of member 19. A releasable plug 50 is threaded in such apertured portion 19E, but when such plug is removed an opening is provided by the apertured portion 19E to allow screwdriver adjustment of the element 47A.

It is noted that the optical axis 52 of the lens system 24, 25, i.e., the axis of tube 15, is in alignment with the photocell 27. This axis 52 makes an angle of approximately 40°, as shown, with the plane 20 along which the elements 18 and 19 are nested.

It is seen that the optical axis 52 which corresponds to the radiation beam 13 in Figure 1 may be adjustably oriented both in azimuth and in elevation with the support 16 remaining stationary. Thus, if it is desired to adjust the optical axis 52 in azimuth, the jam nut 17 (Figure 3) is released and the housing 11 is then turned about the axis of the tubular support 16 through an angle which extends continuously through 360°. The optical axis 52 may be adjustably oriented in elevation by releasing slightly the bolt 35 and by then turning the upper housing member 19 on the lower housing member 18 the required amount, after which the bolt 35 is again tightened. It is noted that this latter adjustment causes not only some slight adjustment in elevation but also causes some slight adjustment in azimuth; and thus proper orientation in both azimuth and elevation usually requires a combination of adjustments involving loosening and fastening of the jam nut 17 and the bolt 35.

While only the internal structure in the housing 11 is described in detail herein, it is appreciated that electrical apparatus in the other housing 10 is mounted in similar manner, and instead of there being a photocell in the housing 10 a radiation emitting device such as a lamp is disposed in the housing 10 in the same position as the cell 27 and in the same manner as shown in Figure 2.

It is also appreciated that instead of using a light source, other forms of radiation reducing means and detecting means may be used such as, for example, the emitting source may be a source of radioactive radiation and the cooperating radiation responsive device may be a Geiger counter or the like.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. Structure of the character described comprising a tubular support, a sphere including a pair of hemispherical members which are nested together, means rotatably mounting one of said members on said tubular support about the axis of said tubular support, said pair of members being nested together on a plane which is inclined with respect to said axis, means releasably securing said members together, said means when released allowing rotation of the other one of said members on said one member, said other member having an apertured portion, a radiation tube with a lens therein in said apertured portion, a chassis plate sandwiched between the two members, electrical apparatus in registry with said apertured portion mounted on said chassis, said electrical apparatus including a connecting wire which passes through said tubular support.

2. Structure of the character described comprising a tubular support having a threaded end, a sphere rotatably mounted about an axis on said support and including a pair of hemispherical members which are nested together, first means for adjustably securing said sphere on said support including an internally threaded portion of one of said members threaded on said threaded end and a jam nut on said threaded end engageable with said one member, a circular chassis plate sandwiched between the nested members, said members being nested together on a plane which is inclined with respect to said axis, the other one of said members having an apertured portion, second means non-rotatably securing said circular chassis plate on said one member, third means for releasably securing said two members together with said plate sandwiched therebetween, said third means including a bolt having its axis extending generally perpendicular to said plane with the head of the bolt engaging a portion of said other member and with the threaded portion of said bolt engaging an internally threaded portion of said one member, said bolt passing through an apertured portion of said chassis plate, electrical apparatus mounted on said chassis plate in registry with said apertured portion of said other member, said electrical apparatus including a connecting wire which passes through said tubular support.

3. Structure as set forth in claim 2 including a tubular externally threaded sleeve concentric with said bolt and having one end thereof threaded into said other member, a sub-chassis plate having an apertured portion through which said sleeve passes, a pair of jam nuts on said threaded sleeve and engaging opposite sides of said sub-chassis plate, said sub-chassis carrying a tube socket, said electrical apparatus including a tube mounted in the tube socket, said circular chassis plate being apertured with said tube passing therethrough with a portion of the tube extending into said one member, a connecting plug in said one member and having said wire connected thereto.

4. Structure as set forth in claim 3 including an adjustable electrical element mounted on said sub-chassis, and a releasable plug threaded into an access apertured hole to permit access to said adjustable electrical element when said plug is removed.

5. Structure as set forth in claim 2 including a radiation tube in said apertured portion of said other member with the axis of said radiation tube making an angle of approximately 40° with respect to said plane.

References Cited in the file of this patent

UNITED STATES PATENTS

| | | |
|---|---|---|
| 2,003,534 | Green | June 4, 1935 |
| 2,243,712 | Levy | May 27, 1941 |
| 2,308,567 | Reichart | Jan. 19, 1943 |
| 2,434,223 | Park | Jan. 6, 1948 |
| 2,688,099 | Bickley | Aug. 31, 1954 |
| 2,711,093 | Edelman et al. | June 21, 1955 |
| 2,762,932 | Falge et al. | Sept. 11, 1956 |